US011525218B2

(12) United States Patent
Peuranen et al.

(10) Patent No.: US 11,525,218 B2
(45) Date of Patent: Dec. 13, 2022

(54) BARRIER COATING COMPOSITION, SHEET-LIKE PRODUCT AND ITS USE

(71) Applicant: Kemira Oyj, Helsinki (FI)

(72) Inventors: Helena Peuranen, Espoo (FI); Sami Puttonen, Helsinki (FI); Tarja Turkki, Helsinki (FI); Mari Ojanen, Espoo (FI); Erland Hermansson, Helsinki (FI)

(73) Assignee: Kemira Oyj, Helsinki (FI)

( * ) Notice: Subject to any disclaimer, the term of this patent is extended or adjusted under 35 U.S.C. 154(b) by 378 days.

(21) Appl. No.: 16/619,100

(22) PCT Filed: Jun. 14, 2018

(86) PCT No.: PCT/FI2018/050463
§ 371 (c)(1),
(2) Date: Dec. 4, 2019

(87) PCT Pub. No.: WO2018/229343
PCT Pub. Date: Dec. 20, 2018

(65) Prior Publication Data
US 2020/0095732 A1 Mar. 26, 2020

(30) Foreign Application Priority Data
Jun. 15, 2017 (FI) ...................................... 20175557

(51) Int. Cl.
| D21H 19/22 | (2006.01) |
| D21H 21/16 | (2006.01) |
| C09D 7/65 | (2018.01) |
| C09D 7/61 | (2018.01) |
| C09D 7/43 | (2018.01) |
| B65D 65/42 | (2006.01) |
| C09D 5/00 | (2006.01) |
| C09D 125/14 | (2006.01) |
| C09D 129/04 | (2006.01) |
| C09D 133/06 | (2006.01) |
| D21H 19/58 | (2006.01) |
| D21H 19/60 | (2006.01) |
| D21H 27/10 | (2006.01) |

(52) U.S. Cl.
CPC ............ *D21H 21/16* (2013.01); *B65D 65/42* (2013.01); *C09D 5/00* (2013.01); *C09D 7/43* (2018.01); *C09D 7/61* (2018.01); *C09D 7/65* (2018.01); *C09D 125/14* (2013.01); *C09D 129/04* (2013.01); *C09D 133/062* (2013.01); *D21H 19/22* (2013.01); *D21H 19/58* (2013.01); *D21H 19/60* (2013.01); *D21H 27/10* (2013.01)

(58) Field of Classification Search
CPC ........ D21H 19/58; D21H 19/22; D21H 21/16; D21H 19/60; D21H 19/20; D21H 19/56; C09D 125/14; C09D 7/65; C09D 133/062; C09D 5/00; C09D 133/04; C09D 7/61; C09D 133/10; C09D 7/43; C09D 124/14; B65D 65/42; C08L 29/04
USPC ...................................................... 162/164.7
See application file for complete search history.

(56) References Cited

U.S. PATENT DOCUMENTS

| 6,235,843 B1 | 5/2001 | Eck |
| 2001/0025078 A1 | 9/2001 | Mayer et al. |
| 2003/0232211 A1 | 12/2003 | Kendall et al. |
| 2004/0151886 A1 | 8/2004 | Bobsein |
| 2011/0262745 A1 | 10/2011 | Ronka |
| 2013/0330527 A1 | 12/2013 | Hartmann et al. |

FOREIGN PATENT DOCUMENTS

| CN | 1500563 A | 6/2004 |
| CN | 101631838 A | 1/2010 |
| CN | 104080607 A | 10/2014 |
| CN | 105408223 A | 3/2016 |
| EP | 1958985 A1 | 8/2008 |
| EP | 2777934 A1 | 9/2014 |
| JP | H06200498 A | 7/1994 |
| JP | H09268494 A | 10/1997 |
| JP | 2000220094 A | 8/2000 |
| JP | 2001262050 A | 9/2000 |
| JP | 2000303026 A | 10/2000 |
| JP | 2002105383 A | 4/2002 |
| JP | 2003268318 A | 9/2003 |
| JP | 2005048320 A | 2/2005 |
| JP | 2007021959 A | 2/2007 |
| JP | 2013067101 A | 4/2013 |
| JP | 2014237309 A | 12/2014 |
| RU | 2518968 C2 | 6/2014 |
| WO | 2008103123 A2 | 8/2008 |
| WO | 2011025035 A1 | 3/2011 |
| WO | 2016174309 A1 | 11/2016 |
| WO | 2016184799 A1 | 11/2016 |
| WO | 2017115009 A1 | 7/2017 |
| WO | 2016144799 A1 | 9/2017 |

OTHER PUBLICATIONS

Search report of corresponding Russian application No. 2019143112, dated Jun. 7, 2021, 4 pages.
Hua-long Zhou, "Leather Chemical Material". China Light Industry Press, p. 131, Jul. 2000.
Chengdu University of Science and Technology, et al., "Leather Chemistry and Technology vol. 2". Light Industry Press, p. 487, Aug. 1982.

(Continued)

*Primary Examiner* — Mark Halpern
(74) *Attorney, Agent, or Firm* — Meunier Carlin & Curfman LLC

(57) ABSTRACT

A barrier coating composition is disclosed including 30-70 weight-% of a styrene (meth)acrylate copolymer, polymerised in the presence of a stabiliser, and the styrene (meth) acrylate copolymer having a glass transition temperature Tg≤20° C., preferably ≤10° C., 30-70 weight-% of a polyvinyl alcohol, and at most 5.0 weight-% of a cross-linker, reacting with —OH or —COOH groups. Further disclosed is a sheet-like product coated with the coating composition.

18 Claims, 5 Drawing Sheets

(56) References Cited

OTHER PUBLICATIONS

Figure 1:
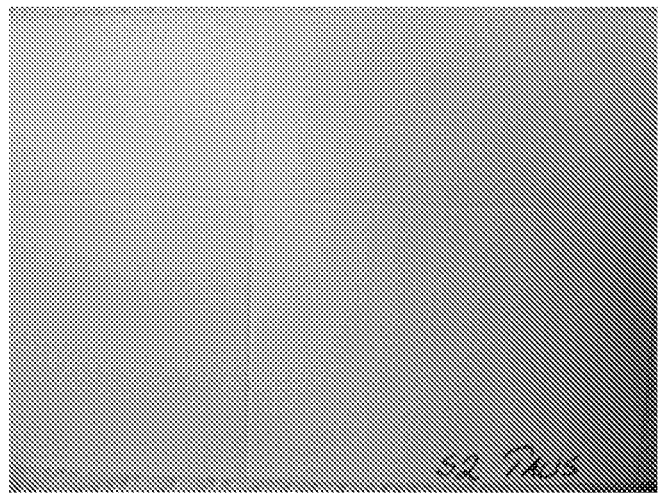

Zheng-jun Li et al., "Leather Finishing Agent and Dressing Technologies". Chemical Industry Press, p. 27, Jul. 2002.
First office action of corresponding Chinese application No. 2018800386380, dated Aug. 10, 2021, 37 pages.
Finnish Patent and Registration Office, Search Report of Finnish patent application No. 20175557, dated Jan. 9, 2018, 2 pages.
Office action from the Patent Office of Japan in corresponding application JP2019-568754 dated Mar. 1, 2022 and received on Apr. 8, 2022; 10 pages.

BARRIER COATING COMPOSITION, SHEET-LIKE PRODUCT AND ITS USE

PRIORITY

This application is a U.S. national application of the international application number PCT/FI2018/050463 filed on Jun. 14, 2018 and claiming priority of Finnish application 20175557 filed on Jun. 15, 2017 the contents of all of which are incorporated herein by reference.

FIELD OF THE INVENTION

The present invention relates to a barrier coating composition, a sheet-like product and use of the product according to the preambles of the enclosed independent claims.

BACKGROUND OF THE INVENTION

Various coatings can be applied on the surface of paper or board in order to improve their properties. Grease barrier and water vapour barrier properties are particularly important for paper and board that are used for products for packaging purposes. Coating applied on the surface of paper or board should provide an effective barrier for leakage from the goods inside the package and/or protect the packaged goods from contamination and/or contact with the surrounding atmosphere. For packaging materials used for foodstuff and consumable liquids the barrier requirements are especially stringent.

Coatings for packaging purposes should also have good resistance for creasing and folding. The coating should not crack when the paper or board is folded into a box or wrapped around the product. Cracking may decrease or even completely destroy the barrier properties of the coating.

Furthermore, paper and board coatings should be resistant for blocking during the product manufacturing and converting processes. If the coating layer softens under high pressure and high temperature it may adhere after rewinding to the next layer on the reel and block the whole reel when cooled down. During the converting process the coating should have suitable friction properties in order to run smoothly in the process. The coating should also have appropriate glueability, which determine the speed and strength of a bond generated by the application of an adhesive to the coating surface, in order to be used at high speed packing lines.

Conventionally fluorochemicals have been used in coating compositions to provide desired barrier properties with resistance to cracking. For environmental reason it would desirable to find effective alternatives for fluorochemicals.

The coatings used for packages should also satisfy the recyclability requirements. Paper and board packages are ideally collected for recycling, i.e. repulping. The coating applied on these products should thus also fulfil the requirements of recycling and, for example, it should not disturb the repulping process. Traditional plastic films laminated on the surface of paper or board are not necessarily easily repulpable. Thus laminated paper and board products often end up as energy waste, which is uneconomical in view of the resources.

SUMMARY OF THE INVENTION

An object of this invention is to minimise or possibly even eliminate the disadvantages existing in the prior art.

Another object of the present invention is to provide a barrier coating composition and a sheet-like product that provide good grease and water vapour barrier properties.

An object of the present invention is to provide a barrier coating composition, which can be used to create a coating that withstands cracking when creased and/or folded.

A further object of the present invention is to provide a barrier coating composition that is suitable for coating at high coating speeds and has good runnability.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

BRIEF DESRIPTION OF THE DRAWINGS

Figure 2:
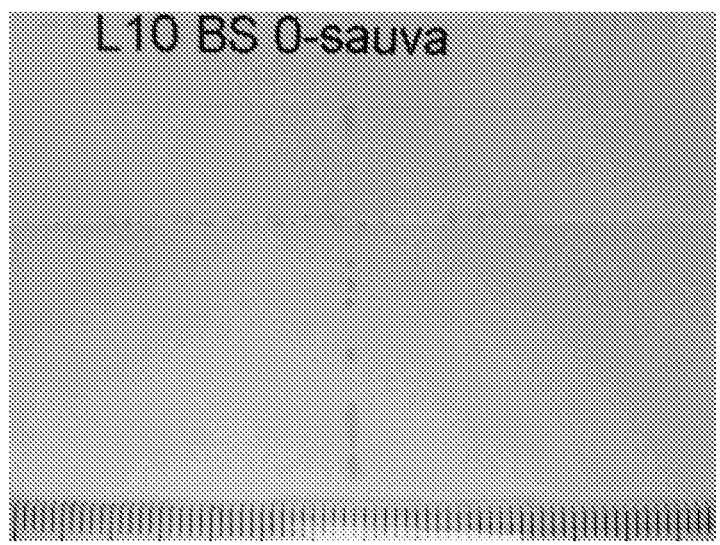
Figure 3:
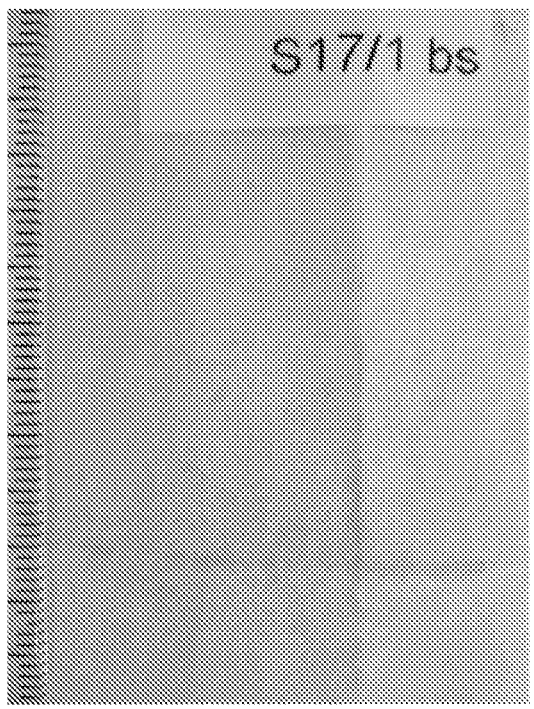
Figure 4:
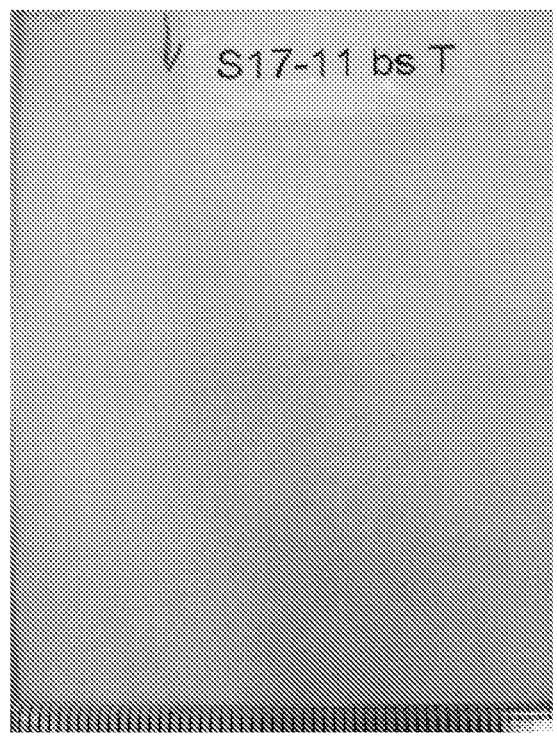
Figure 5:
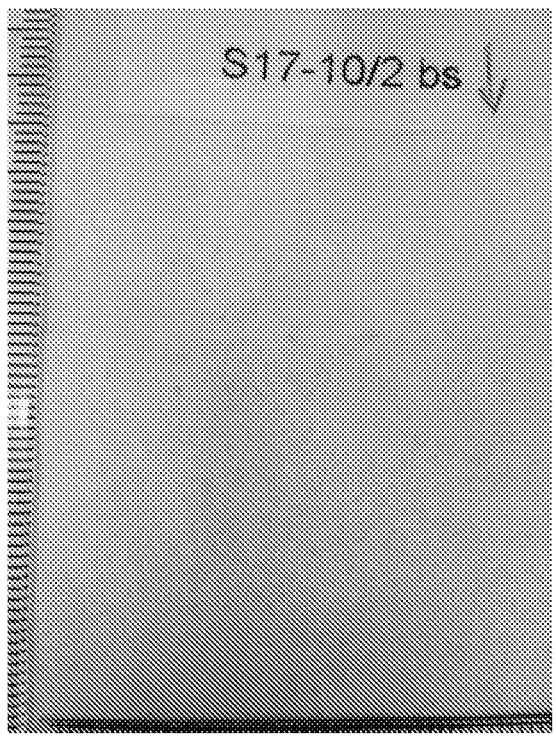
Figure 6:
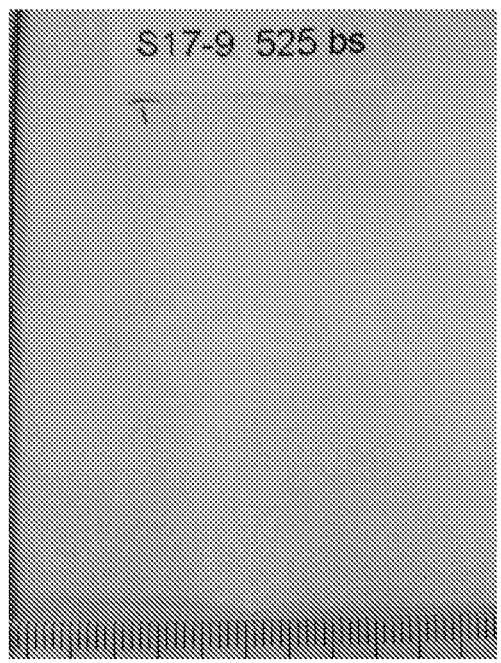
Figure 7:
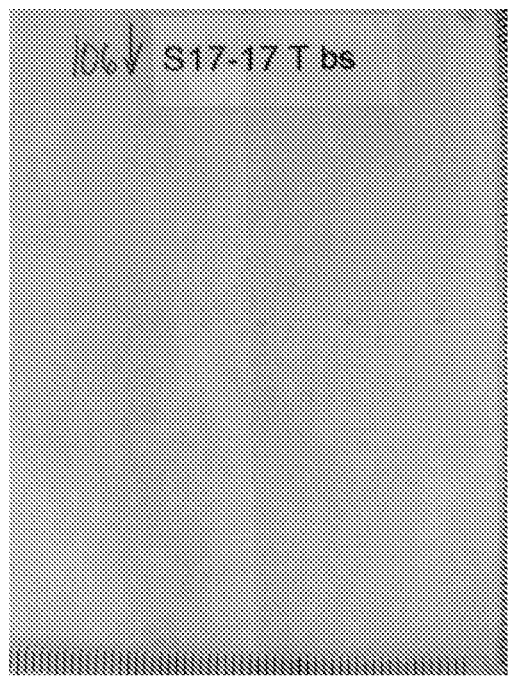
Figure 8:
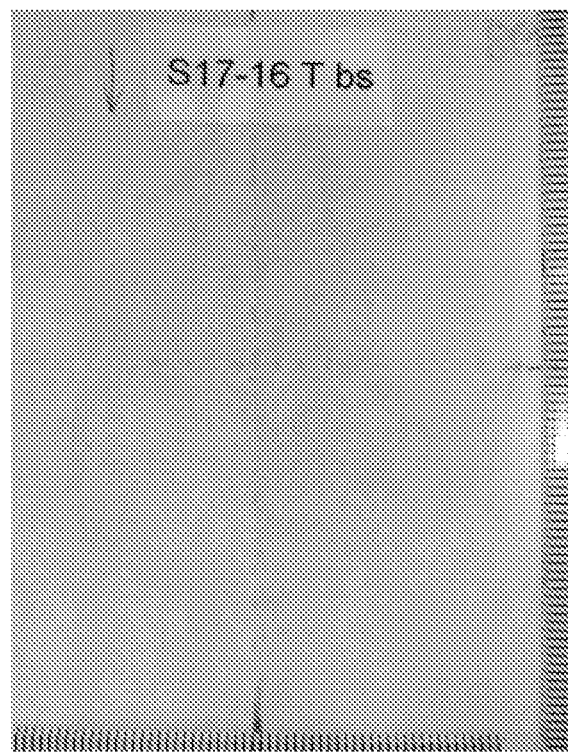
Figure 9:
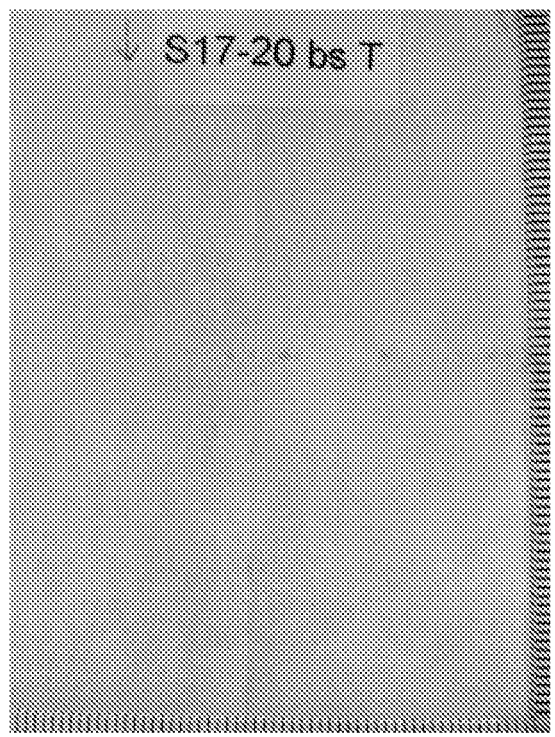
Figure 10:
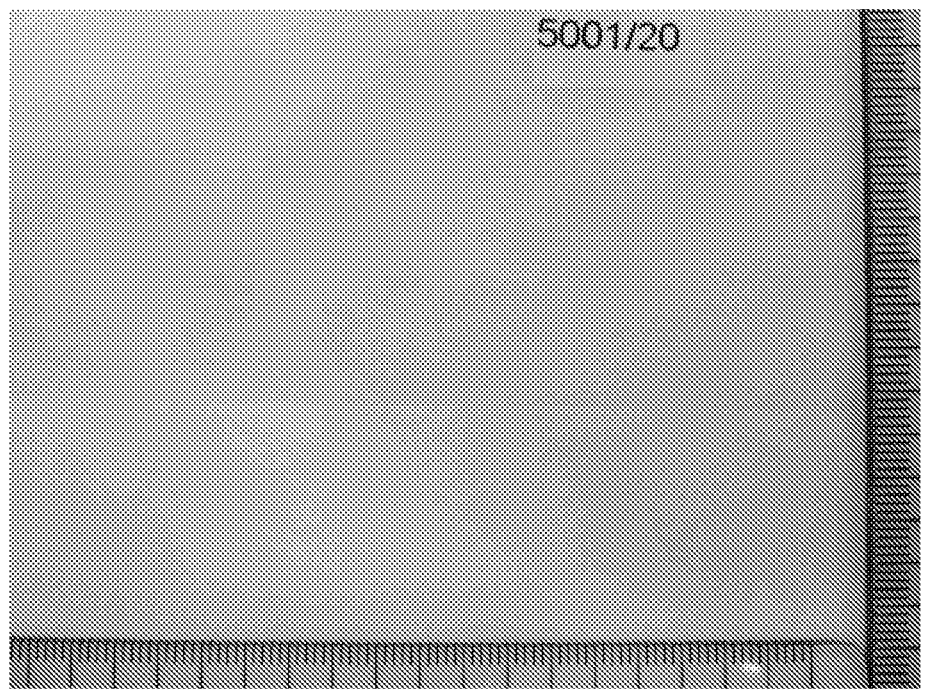

FIG. 1 shows visual result for creased and stained sample of Reference Example 1. FIG. 2 shows visual result for creased and stained sample of Reference Example 2. FIG. 3 shows visual result for creased and stained sample of Reference Example 3. FIG. 4 shows visual result for creased and stained sample of Coating Example 1. FIG. 5 shows visual result for creased and stained sample of Coating Example 2. FIG. 6 shows visual result for creased and stained sample of Coating Example 3. FIG. 7 shows visual result for creased and stained sample of Coating Example 4. FIG. 8 shows visual result for creased and stained sample of Coating Example 5. FIG. 9 shows visual result for creased and stained sample of Coating Example 6. FIG. 10 shows visual result for creased and stained sample of Coating Example 7.

DETAILED DESCRIPTION OF THE INVENTION

Typical barrier coating composition according to the present invention comprises
- 30-70 weight-% of styrene (meth)acrylate copolymer, which is polymerised in the presence of a stabiliser, and which has a glass transition temperature $T_g \leq 20°$ C., preferably $\leq 10°$ C.,
- 30-70 weight-% of polyvinyl alcohol, and
- at the most 5.0 weight-% of a cross-linker, which reacts with —OH or —COOH groups.

Typical sheet-like product according to the present comprises
- a substrate comprising lignocellulosic fibres, and having a first and second parallel large surface, and
- a barrier coating layer formed from a barrier coating composition according to the present invention applied on at least one the surfaces of the substrate.

Now it has been surprisingly found out that the barrier coating composition according to the invention provides good resistance for cracking, even when the coated substrate is folded during the manufacture of a package. The barrier coating composition also provides good barrier against grease and/or moisture when it is applied on the surface of a substrate comprising lignocellulosic fibres. Furthermore, the barrier coating composition provides a coating layer that shows a reduced adherence to adjacent coating surfaces when produced web is wound into a roll or stacked as sheets. The barrier coating composition according to the present invention thus provides, inter alia, optimal properties for packaging and other similar purposes.

In the present context, all weight-% values given for the various components in the coating composition are calculated from the total dry solids content of the coating composition.

The barrier coating composition is prepared by mixing together the individual components of the composition in any industrial mixing apparatus suitable for mixing coating compositions for paper and board. Usually no polymerisation reactions occur between the components after mixing.

The barrier coating composition comprises 30-70 weight-% of styrene (meth)acrylate copolymer which is polymerised in the presence of a stabiliser, and which has a glass transition temperature $Tg \leq 20°$ C., preferably $\leq 10°$ C. According to one embodiment of the invention the barrier coating composition may comprise 30-70 weight-%, preferably 40-65 weight-%, more preferably 45-60 weight-%, of the styrene (meth)acrylate copolymer. The barrier coating composition further comprises 30-70 weight-% of polyvinyl alcohol, preferably 35-65 weight-%, more preferably 40-60 weight-%, even more preferably 45-60 weight-%, of polyvinyl alcohol. It has been observed that these amounts of styrene (meth)acrylate copolymer and polyvinyl alcohol provide good or even excellent barrier properties without cracking tendency. According to one embodiment of the invention the ratio of styrene (meth)acrylate copolymer to polyvinyl alcohol is from 1:2 to 2:1.

The styrene (meth)acrylate copolymer, which is suitable for use in the present invention, may be obtained by free radical emulsion copolymerisation of at least monomer (a), monomer (b) and an optional monomer (c) in the presence of a stabiliser, where monomer (a) is at least one optionally substituted styrene and monomer (b) is at least one C1-C4-alkyl (meth)acrylate. The styrene (meth)acrylate copolymer may have a weight average molecular weight <100 000 g/mol, preferably <75 000 g/mol.

According to one preferable embodiment the monomer (a) of the styrene (meth)acrylate copolymer is selected from group comprising styrene, substituted styrenes, such as α-methylstyrene, vinyltoluene, ethylvinyltoluene, chloromethylstyrene, and any mixtures thereof. The amount of monomer (a) may be 0.1-75 weight-%, preferably 5-60 weight-%, more preferably 10-55 weight-%, calculated from the total dry solids content of the monomers (a), (b) and optional (c).

Suitable monomer (b) of the styrene (meth)acrylate copolymer may be selected from group consisting of C1-C4-alkyl acrylates; C1-C4-alkyl methacrylates; or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferable embodiment of the invention the monomer (b) is selected from butyl (meth)acrylates. It can comprise, for example, a mixture of at least two isomeric butyl acrylates. More preferably, the monomer component (b) is n-butyl acrylate, tert-butyl acrylate or a mixture of n-butyl acrylate and tert-butyl acrylate. The amount of monomer (b) may be 25-99.9 weight-%, preferably 30-95 weight-%, more preferably 35-90 weight-%, calculated from the total dry solids content of the monomers (a), (b) and optional (c).

According to one embodiment the styrene (meth)acrylate copolymer originates also at least from one optional monomer (c), which is ethylenically unsaturated and different from monomers (a) and (b). Preferably the styrene (meth) acrylate copolymer is a carboxylated copolymer, preferably obtained by polymerising the above described monomers (a) and (b) with monomer (c), which is selected from carboxylic acids, such as acrylic acid, methacrylic acid, itaconic acid, maleic acid or styrene sulphonic acid. Acrylic acid and styrene sulphonic acid are being preferred as optional monomer (c). The amount of the optional monomer (c) may be 0.1-15 weight-%, preferably 0.1-10 weight-%, more preferably 1-5 weight-%, calculated from the total dry solids content of the monomers (a), (b) and (c).

According to one embodiment of the invention the styrene (meth)acrylate copolymer is polymerised in the presence of a stabiliser, which is selected from degraded starch or polyvinyl alcohol, preferably from degraded starch having average molecular weight Mn from 500 to 10 000 Da. Degraded starch may be obtained by subjecting starch to oxidative, thermal, acidic, hydrolytic or enzymatic degradation. The oxidative degradation is presently being preferred. Hypochlorite, peroxodisulphate, hydrogen peroxide or their mixtures may be used as oxidising agents. Degraded starch, which is used in the present invention, may be any suitable degraded natural starch, such as potato, rice, corn, waxy corn, wheat, barley or tapioca starch. Starches having an amylopectin content >80%, preferably >95%, are advantageous.

The polymerisation of the styrene (meth)acrylate copolymer may be carried out by addition of the above described monomers, either individually or as a mixture, and free radical initiator(s) suitable for initiating the polymerisation, to the aqueous stabiliser solution. The polymerisation process is typically carried in the absence of oxygen, preferably in an inert gas atmosphere, for example under nitrogen.

According to one embodiment of the invention the total amount of monomers in the reaction mixture is 10-92 weight-%, preferably 20-90 weight-%, more preferably 35-88 weight-%, calculated from the total dry solids content of the reaction mixture. The amount of monomers refers here to the total amount of monomers (a), (b) and optional (c), which are added to the reaction mixture during the polymerisation process.

The styrene (meth)acrylate copolymer may have a glass transition temperature in the range of −40-20° C., preferably −30-15° C., more preferably −20-10° C., sometimes even more preferably −5-10° C. These glass transition temperature ranges provide copolymers which show required barrier properties but are soft enough to withstand cracking when the substrate is creased or folded into a package.

According to one embodiment of the invention the barrier coating composition comprises polyvinyl alcohol that has molecular weight of 50 000 g/mol, preferably 13 000-50 000 g/mol. Preferably polyvinyl alcohol may be at least partially hydrolyzed, preferably with a hydrolysis degree of at least 30%, more preferably 85-98%. As water soluble polymer polyvinyl alcohol improves the film formation and thus improves both water vapour and mineral oil barrier properties. It also reduces blocking tendency.

The barrier coating composition further comprises at the most 5.0 weight-%, preferably at the most 3.0 weight-%, of a cross-linker, which reacts with —OH or —COOH groups. According to one embodiment of the invention the barrier coating composition may comprise cross-linker in amount of 0.1-5 weight-%, preferably 0.1-4 weight-%, more preferably 0.5-3 weight-%. The cross-linker is preferably selected from ammonium zirconium carbonate, potassium zirconium carbonate, glyoxal or citric acid. Cross-linkers make the coating layer less sensitive for water, e.g. by reducing the number of end groups available for reactions with water. Cross-linker may also improve the repulping properties of the final produced coating.

According to one embodiment of the invention the barrier coating layer may also comprise plasticizer in amount of 0.1-15 weight-%, preferably 1-10 weight-%, more preferably 2-7.5 weight-%. The plasticizer may be selected from polyethylene glycols, sorbitol and glycerol. Plasticizer can improve the folding properties of the coating layer by reducing the cracking tendency of the coating layer.

The barrier coating composition may comprise a natural or synthetic thickener. The synthetic thickener may be selected from a group comprising synthetic pH-triggered thickeners, such as alkali soluble/swellable emulsion (ASE) thickeners and hydrophobically-modified alkali soluble emulsion (HASE) thickeners. The natural thickeners may be selected from carboxymethyl cellulose, xanthan gum, guar gum or gum Arabic. Thickeners improve the runnability of the coating colour, especially at high coating speeds. The barrier coating composition may comprise thickener in amount of 0.1-5 weight-%, preferably 0.1-2 weight-%, more preferably 0.1-1 weight-%.

According one embodiment of the invention the barrier coating composition comprises inorganic mineral particles. The mineral particles may be selected from calcium carbonate, such as ground calcium carbonate and precipitated calcium carbonate, talc and kaolin. According to one preferable embodiment the barrier coating composition comprises inorganic mineral particles of ground calcium carbonate. Typically the amount of inorganic mineral particles in the barrier coating composition is <30 weight-%, preferably <27 weight-%, more preferably <25 weight-%, sometimes even <20 weight-%. The amount of mineral particles may be, for example, in the range of 0.1-30 weight-%, preferably 0.1-27 weight-%, preferably 0.1-25 weight-%. Addition of mineral particles is advantageous when coating porous substrates, such as unsized base paper or board.

According to one embodiment the barrier coating composition may comprise inorganic platy mineral particles. In the present context platy mineral is understood as an inorganic mineral, whose particles have a form factor >10. Typical examples of inorganic platy mineral particles are kaolin, talc and any of their mixtures. Typically the amount of inorganic platy mineral particles in the barrier coating composition is 0.1-10 weight-%, preferably 0.1-5 weight-%.

According to another preferable embodiment of the present invention the barrier coating composition is free of inorganic mineral pigment particles.

Barrier coating layer on the surface of the substrate may have a maximum weight of ≤12 $g/m^2$, preferably ≤10 $g/m^2$, sometimes even ≤5 $g/m^2$. According to one embodiment the barrier coating layer may have weight of 0.5-12 $g/m^2$, preferably 0.5-10 $g/m^2$, sometimes 0.5-10 $g/m^2$. Preferably the coating layer weight is as small as possible, while providing a good film formation and barrier properties.

The substrate which is coated with the barrier coating composition is preferably a substrate comprising lignocellulosic fibres. The lignocellulosic fibres may have been obtained by any conventional pulping process, including chemical, mechanical, chemi-mechanical pulping processes. The lignocellulosic fibres may also be recycled fibres. The substrate has a first and second parallel large surface, and it is usually in form of a fibrous web. The substrate may have a grammage of 25-800 $g/m^2$, preferably 30-700 $g/m^2$, more preferably 40-500 $g/m^2$.

The barrier coating composition may be applied on at least one the large surfaces of the substrate by using any conventional coating techniques, such as rod coating, blade coating, spray coating or curtain coating.

According to one preferable embodiment, especially when the used barrier coating composition is free of inorganic mineral particles, the obtained coated product has TAPPI 559 KIT test value of at least 8, preferably 10, more preferably 12. The KIT test value measures the repellency of the coating to oil and grease and the measurements are performed according to standard TAPPI method T-559 pm-96.

According to one preferable embodiment the obtained coated product has a mineral oil barrier HVTR value <100 $g/m^2/d$. The used Hexane Vapour Transmission Rate (HVTR) value is obtained by using cup test method developed by BASF. In the test hexane is placed in a measurement cup covered by barrier sample, and the evaporation of hexane through the known area is measured. The test method is commonly known for persons skilled in the art.

According to one preferable embodiment the obtained coated product has a water vapour barrier at 23° C. and 50% relative humidity WVTR value <100 $g/m^2/d$. WVTR value can be measured by using standard methods of ASTM F-1249, ISO 15105-2, ISO 15106-3, DIN 53122-2.

The product can be used for making a foodservice package or for liquid packaging. Typical examples of foodservice packages are packages for fast food, ready-to-eat meals, sandwiches, bakery products, such as cookies, doughnuts, or the like.

EXPERIMENTAL

Reference Examples 1-3 and Examples 1-7 provide results for barrier coating without pigment addition.

Reference Example 4 and Examples 8-12 use recycled cardboard as substrate.

These Examples provide information about barrier coatings containing inorganic mineral particles.

Used barrier binder had glass transition temperature of 10° C. both. Tests were carried out on recycled cardboard, with basis weight 295 $g/m^2$.

In all the examples the coating was carried out using K control coater draw down coater and different wound rods. Coat weight was determined by weighting the coated samples and uncoated base papers and coat weight was obtained by the weight difference. Creasing tests were done using Cyklos CPM 450 unit. Creasing and folding was done in machine and cross directions. Staining test was done for the creased samples by using methyl red dissolved in ethanol. For folding, Cobb roller was used to give uniform folding pressure.

Water resistance was tested using Cobb300 test. Water vapor barrier properties were measured using Systech Permeation Analyzers M7002 instrument. Hexane vapor transmission rate was determined by using a cup method. 20 grams of hexane was placed in a metal cup. Barrier sample was placed on top of the cup between two gaskets, coated side down. Metal frame was used to tighten the sample to the cup. Weight loss was recorded for 24 hours.

Blocking tests were carried out at 40° C. temperature and 150 bar pressure for four hours. The barrier coated sample was placed against the top side coating. Used scale for blocking test results is the following:

Blocking test scale:
1=Sample strips did not stick together
2=There was a noise when pulling the strips apart
3=Coating defects <50% of the contact area
4=Coating defects >50% of the contact area
5=Base paper delamination Reference Example 1

Used substrate was 240 $g/m^2$ folding boxboard. Barrier coating was applied on the uncoated side of the substrate by using RK K Control Coater rod coating unit and coating rod (3) with wire diameter of 24 µm. Coating speed was set to 5 and drying was carried out using IR dryer for 60 s. Used coating colour was 100% styrene acrylate binder with glass transition temperature of 10° C.

Simple converting test was done for the coated samples. The test included sample creasing by using Cyklos CPM 450 creasing and perforation unit, and folding by using Cobb-roller to press the fold at constant pressure. Creasing and folding was done in both machine and cross directions. Staining test was done for the folded samples by using methyl red dissolved in ethanol. Water vapor barrier properties were measured using Systech Permeation Analyzers M7002 instrument. Grease barrier properties were tested using KIT test (TAPPI method T-559 pm-96). Hexane vapor transmission rate was determined using a cup test method developed by BASF.

The obtained results are given in Table 1. Visual result for creased and stained sample is given in FIG. 1.

TABLE 1

Obtained results for Reference Example 1.

| Coating Property | Reference 1 |
|---|---|
| Coat weight (g/m$^2$) | 12.0 |
| HVTR (g/m$^2$*d) | 556 |

Reference Example 2

Used substrate was 45 g/m$^2$ paper. Barrier coating was applied on the uncoated substrate by using RK K Control Coater rod coating unit and coating rod (3) with wire diameter of 24 µm. Coating speed was set to 5 and drying was carried out using IR dryer for 60 s. Used coating colour was 100% polyvinyl alcohol (Poval 6-98). Coat weight was 6.2 g/m$^2$.

Simple converting test was done for the samples in the same manner as described for Reference Example 1.

Visual result for creased and stained sample is given in FIG. 2.

Reference Example 3

Used substrate was 45 g/m$^2$ paper. Barrier coating was applied on the uncoated substrate by using RK K Control Coater rod coating unit and coating rod (3) with wire diameter of 24 µm. Coating speed was set to 5 and drying was carried out using IR dryer for 60 s. Composition of the used coating colour is shown in Table 2. Coat weight was 4.79 g/m$^2$.

TABLE 2

Composition of the coating colour for Reference Example 3.

| | Amount (%) |
|---|---|
| Binder, Styrene acrylate copolymer, Tg = 5° C. | 87.3 |
| Cross-linker, Potassium Zirconium Carbonate | 2.5 |
| Polyvinyl alcohol (Poval 6-98) | 10 |
| Thickener, Xanthan gum | 0.2 |

Simple converting test was done for the samples in the same manner as described for Reference Example 1.

Visual result for creased and stained sample is given in FIG. 3.

Coating Example 1

Used substrate was 45 g/m$^2$ paper. Barrier coating was applied on the uncoated substrate by using RK K Control Coater rod coating unit and coating rod (3) with wire diameter of 24 µm. Coating speed was set to 5 and drying was carried out using IR dryer for 60 s. Composition of the used coating colour is shown in Table 3. Coat weight was 5.8 g/m$^2$.

TABLE 3

Composition of the coating colour for Coating Example 1.

| | Amount (%) |
|---|---|
| Binder, Styrene acrylate copolymer, Tg = 5° C. | 30 |
| Cross-linker, Potassium Zirconium Carbonate | 2.5 |
| Polyvinyl alcohol (Poval 6-98) | 67.3 |
| Thickener, Xanthan gum | 0.2 |

Simple converting test was done for the samples in the same manner as described for Reference Example 1.

Visual result for creased and stained sample is given in FIG. 4. The obtained coated substrate had a mineral oil barrier value HVTR value 10 g/m$^2$*d and a KIT value 12.

Coating Example 2

Used substrate was 45 g/m$^2$ paper. Barrier coating was applied on the uncoated substrate by using RK K Control Coater rod coating unit and coating rod (3) with wire diameter of 24 µm. Coating speed was set to 5 and drying was carried out using IR dryer for 60 s. Composition of the used coating colour is shown in Table 4. Coat weight was 5.7 g/m$^2$.

TABLE 4

Composition of the coating colour for Coating Example 2.

| | Amount (%) |
|---|---|
| Binder, Styrene acrylate copolymer, Tg = 5° C. | 67.3 |
| Cross-linker, Potassium Zirconium Carbonate | 2.5 |
| Polyvinyl alcohol (Poval 6-98) | 30 |
| Thickener, Xanthan gum | 0.2 |

Simple converting test was done for the samples in the same manner as described for Reference Example 1.

Visual result for creased and stained sample is given in FIG. 5.

Coating Example 3

Used substrate was 45 g/m$^2$ paper. Barrier coating was applied on the uncoated substrate by using RK K Control Coater rod coating unit and coating rod (3) with wire diameter of 24 µm. Coating speed was set to 5 and drying was carried out using IR dryer for 60 s. Composition of the used coating colour is shown in Table 5. Coat weight was 6.0 g/m$^2$.

TABLE 5

Composition of the coating colour for Coating Example 3.

| | Amount (%) |
|---|---|
| Binder, Carboxylated styrene acrylate copolymer, Tg = 10° C. | 50 |
| Cross-linker, Potassium Zirconium Carbonate | 2.5 |
| Polyvinyl alcohol (Poval 6-98) | 47.3 |
| Thickener, Xanthan gum | 0.2 |

Simple converting test was done for the samples in the same manner as described for Reference Example 1.

The obtained coated substrate had a mineral oil barrier HVTR value 19 g/m$^2$*d and a KIT value 12.

Visual result for creased and stained sample is given in FIG. 6.

Coating Example 4

Used substrate was 45 g/m$^2$ paper. Barrier coating was applied on the uncoated substrate by using RK K Control Coater rod coating unit and coating rod (3) with wire diameter of 24 μm. Coating speed was set to 5 and drying was carried out using IR dryer for 60 s. Composition of the used coating colour is shown in Table 6. Coat weight was 6.1 g/m$^2$.

TABLE 6

Composition of the coating colour for Coating Example 4.

| | Amount (%) |
|---|---|
| Binder, Styrene acrylate copolymer, Tg = 5° C. | 49.8 |
| Cross-linker, Potassium Zirconium Carbonate | 2.5 |
| Polyvinyl alcohol (Poval 6-98) | 47.2 |
| Thickener, CMC | 0.5 |

Simple converting test was done for the samples in the same manner as described for Reference Example 1.

Visual result for creased and stained sample is given in FIG. 7. The obtained coated substrate had a mineral oil barrier value HVTR value 33 g/m$^2$*d and a KIT value 12.

Coating Example 5

Used substrate was 45 g/m$^2$ paper. Barrier coating was applied on the uncoated substrate by using RK K Control Coater rod coating unit and coating rod (3) with wire diameter of 24 μm. Coating speed was set to 5 and drying was carried out using IR dryer for 60 s. Composition of the used coating colour is shown in Table 7.

TABLE 7

Composition of the coating colour for Coating Example 5.

| | Amount (%) |
|---|---|
| Binder, Styrene acrylate copolymer, Tg = 5° C. | 50 |
| Cross-linker, Potassium Zirconium Carbonate | 2.5 |
| Polyvinyl alcohol (Poval 6-98) | 47.3 |
| Thickener, Guar gum | 0.5 |

Simple converting test was done for the samples in the same manner as described for Reference Example 1.

Visual result for creased and stained sample is given in FIG. 8. The obtained coated substrate had a mineral oil barrier value HVTR value 22 g/m$^2$*d and a KIT value 12.

Coating Example 6

Used substrate was 45 g/m$^2$ paper. Barrier coating was applied on the uncoated substrate by using RK K Control Coater rod coating unit and coating rod (3) with wire diameter of 24 μm. Coating speed was set to 5 and drying was carried out using IR dryer for 60 s. Composition of the used coating colour is shown in Table 8. Coat weight was 6.0 g/m$^2$.

TABLE 8

Composition of the coating colour for Coating Example 6.

| | Amount (%) |
|---|---|
| Binder, Styrene acrylate copolymer, Tg = 5° C. | 50 |
| Cross-linker, Citric acid | 2.5 |
| Polyvinyl alcohol (Poval 6-98) | 47.3 |
| Thickener, Guar gum | 0.2 |

Simple converting test was done for the samples in the same manner as described for Reference Example 1.

Visual result for creased and stained sample is given in FIG. 9. The obtained coated substrate had a mineral oil barrier value HVTR value 12 g/m$^2$*d and a KIT value 12.

Coating Example 7

Used substrate was 45 g/m$^2$ paper. A First barrier coating layer was applied on the uncoated substrate by using pilot coater and a second identical barrier coating layer was applied using a smooth rod. Coating speed was 650 m/min. Composition of the used coating colour is shown in Table 9.

TABLE 9

Composition of the coating colour for Coating Example 7.

| | Amount (%) |
|---|---|
| Binder, Styrene acrylate copolymer, Tg = 5° C. | 50 |
| Cross-linker, Potassium Zirconium Carbonate | 2.5 |
| Polyvinyl alcohol (Poval 6-98) | 47.4 |
| Thickener, Xanthan gum | 0.1 |

Simple converting test was done for the samples in the same manner as described for Reference Example 1.

The obtained results are given in Table 10. Visual result for creased and stained sample is given in FIG. 10.

TABLE 10

Obtained results for Coating Example 7.

| Coating Property | Value for Coating Example 7 |
|---|---|
| Coat weight (g/m$^2$) | 6.3 |
| WVTR 23° C. 50% RH (g/m$^2$, d) | 35.4 |
| KIT | 12 |
| HVTR (g/m$^2$ * d) | 18 |

In order to develop barrier coatings for fibre based packagings it is not sufficient to only look at properties of the coatings as a flat surface. Barrier coated product will go through a converting process and therefore it is crucial for the product to remain intact during the creasing and folding processes. The examples above show that the reference samples only with good barrier properties or convertibility cannot be commercially used if barrier coating cracks at fold and loses the barrier properties it had as flat sample. The examples 1-7 show that different coating formulations can be used to provide good converting properties. Optimisation of all additives has not been completed but positive effect of them has been observed. The product substrate can be single or multilayer coated. The main object with these coating formulations is to obtain improved grease and mineral oil barrier properties.

Reference Example 4

In Reference Example 4 the barrier coating was applied on the uncoated substrate by using RK K Control Coater rod coating unit and coating rod (3) with wire diameter of 24 μm. Coating speed was set to 8 and drying was carried out using IR dryer for 60 s. Composition of the used coating colour is shown in Table 11.

TABLE 11

Composition of the coating colour for Reference Example 4.

|  | Amount (%) |
| --- | --- |
| Binder, Styrene acrylate copolymer, Tg = 10° C. | 50 |
| Polyvinyl alcohol (PVA 6-98) | 47.2 |
| Cross-linker, Potassium Zirconium Carbonate | 2.5 |
| Thickener, Xanthan gum | 0.3 |

First reference base substrate A was unsized 345 g/m² recycled cardboard with Cobb60 value of 444 g/m². The reference coating colour without mineral pigment, when applied on the base substrate at 6.8 g/m² coat weight, provided HVTR value of 269 g/m²*d. With two coating layers, using the same coating colour and base substrate, HVTR was improved to 32 g/m²*d when the total coat weight was 7.3 g/m².

A second reference base substrate B was internally sized cardboard, with basis weight 325 g/m² and Cobb60 value 105 g/m². The reference coating colour without mineral pigment, when applied on the base substrate at 6.4 g/m² coat weight, provided HVTR value of 228 g/m²*d. When coat weight was increased to 7.5 g/m², the obtained HVTR value was 80 g/m²*d.

Results are given in Table 12.

TABLE 12

Obtained results for Reference Example 4.

| Coat weight (g/m²) | Base substrate | HVTR g/m² * d | WVTR g/m² * d |
| --- | --- | --- | --- |
| 6.8 | unsized A, single coated | 269 | 67 |
| 7.3 | unsized A, double coated | 32 | 38 |
| 7.5 | sized B, single coated | 80 | 59 |

It is seen that when the base coat is porous, a single coating layer does not necessarily provide desired barrier properties. In practice, however, it is not always possible to apply two coating layers, or increase the coat weight. Therefore, it would be desirable to obtain good barrier coating by using single coating and relatively low coat weights.

Coating Example 8

Inorganic mineral particles were added to coating colour composition. Mineral particles were platy talc particles, added amount 10%. Composition of the coating colour is shown in Table 13.

TABLE 13

Composition of the coating colour for Coating Example 8.

|  | Amount (%) |
| --- | --- |
| Binder, Styrene acrylate copolymer, Tg = 10° C. | 45 |
| Polyvinyl Alcohol (PVA 6-98) | 42.2 |
| Cross-linker, Potassium Zirconium Carbonate | 2.5 |
| Thicker, Xanthan gum | 0.3 |
| Talc, Finntalc C15 HB | 10 |

Used substrates were unsized 345 g/m² and internally sized 325 g/m² recycled cardboard, as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Results are shown in Table 14.

TABLE 14

Obtained results for Coating Example 8

| Coat weight (g/m²) | Base substrate | HVTR g/m² * d | WVTR g/m² * d |
| --- | --- | --- | --- |
| 7.8 | A, unsized | 96 | 49 |
| 7.5 | B, sized | 80 | 59 |

Coating Example 9

Inorganic mineral particles were added to coating colour composition. Mineral particles were coarse ground calcium carbonate, added amount 20%. Composition of the coating colour is shown in Table 15.

TABLE 15

Composition of the coating colour for Coating Example 9.

|  | Amount (%) |
| --- | --- |
| Binder, Styrene acrylate copolymer, Tg = 10° C. | 38.6 |
| Polyvinyl Alcohol (PVA 6-98) | 38.6 |
| Cross-linker, Potassium Zirconium Carbonate | 2.5 |
| Thickener, Xanthan gum | 0.3 |
| Ground Calcium Cabonate (Hydrocarb 60) | 20 |

Used substrate was internally sized 325 g/m² recycled cardboard, same as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Results are shown in Table 16.

TABLE 16

Obtained results for Coating Example 9.

| Coat weight (g/m²) | HVTR (g/m² * d) | WVTR (g/m² * d) | Blocking |
|---|---|---|---|
| 9.6 | 60 | 49 | 1.3 |

Coating Example 10

Inorganic mineral particles were added to coating colour composition. Mineral particles were fine ground calcium carbonate, added amount 20%. Composition of the coating colour is shown in Table 17.

TABLE 17

Composition of the coating colour for Coating Example 10.

| | Amount (%) |
|---|---|
| Binder, Styrene acrylate copolymer, Tg = 10° C. | 38.8 |
| Polyvinyl Alcohol (PVA 4-98) | 38.7 |
| Cross-linker, Potassium Zirconium Carbonate | 2.5 |
| Ground Calcium Carbonate (Hydrocarb 75) | 20 |

Used substrate was internally sized 325 g/m² recycled cardboard, same as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Results are shown in Table 18.

TABLE 18

Obtained results for Coating Example 10.

| Coat weight (g/m²) | HVTR (g/m² * d) |
|---|---|
| 8.5 | 63 |
| 9.7 | 38 |

Coating Example 11

Inorganic mineral particles were added to coating colour composition. Mineral particles were fine ground calcium carbonate, added amount 25%. Composition of the coating colour is shown in Table 19.

TABLE 19

Composition of the coating colour for Coating Example 11.

| | Amount (%) |
|---|---|
| Binder, Styrene acrylate copolymer, Tg = 10° C. | 36.3 |
| Polyvinyl Alcohol (PVA 4-98) | 36.2 |
| Cross-linker, Potassium Zirconium Carbonate | 2.5 |
| Ground Calcium Carbonate (Hydrocarb 75) | 25 |

Used substrate was internally sized 325 g/m² recycled cardboard, same as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Coat weight was 8.8 g/m² and the obtained HVTR value was 96 g/m²*d.

Coating Example 12

Inorganic mineral particles were added to coating colour composition. Mineral particles were coarse ground calcium carbonate, added amount 25%. Composition of the coating colour is shown in Table 20.

TABLE 20

Composition of the coating colour for Coating Example 12.

| | Amount (%) |
|---|---|
| Binder, Styrene acrylate copolymer, Tg = 10° C. | 37.6 |
| Polyvinyl Alcohol (PVA 4-98) | 37.4 |
| Cross-linker, ammonium zirconium Carbonate | 2.5 |
| Ground Calcium Carbonate (Hydrocarb 60) | 22.5 |

Used substrate was internally sized 325 g/m² recycled cardboard, same as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Coat weight was 9.5 g/m² and the obtained HVTR value was 93 g/m²*d.

Coating Example 13

Inorganic mineral particles were added to coating colour composition. Mineral particles were a mixture of two ground calcium carbonates, added amount 20%. Composition of the coating colour is shown in Table 21.

TABLE 21

Composition of the coating colour for Coating Example 13.

| | Amount (%) |
|---|---|
| Binder, Styrene acrylate copolymer, Tg = 10° C., low carboxylation | 38.8 |
| Polyvinyl Alcohol (PVA 6-88) | 38.7 |
| Cross-linker, Potassium Zirconium Carbonate | 2.5 |
| Ground Calcium Carbonate mixture (Setacarb 75/Hydrocarb 75) | 20 |

Used substrate was internally sized 325 g/m² recycled cardboard, same as in Reference Example 4. Barrier coating was applied on the uncoated substrate by using RK K Control Coater rod coating unit and coating rod (3) with wire diameter of 24 μm. Coating speed was set to 8 and drying was carried out using IR dryer for 60 s. Results are shown in Table 22.

TABLE 22

Obtained results for Coating Example 13.

| Coat weight (g/m²) | HVTR (g/m² * d) |
|---|---|
| 6.8 | 49 |
| 9.1 | 26 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A barrier coating composition comprising:
   30-70 weight-% of a styrene (meth)acrylate copolymer, polymerized in the presence of a stabilizer, said styrene (meth)acrylate copolymer having a glass transition temperature Tg≤20° C.;
   30-70 weight-% of a polyvinyl alcohol; and
   at most 5.0 weight-% of a cross-linker capable of reacting with —OH or —COOH groups in the coating composition.

2. The composition according to claim 1, wherein a ratio of the styrene (meth)acrylate copolymer to the polyvinyl alcohol is from 1:2 to 2:1.

3. The composition according to claim 1, wherein the styrene (meth)acrylate copolymer has a glass transition temperature in a range of −40-20° C.

4. The composition according to claim 1, wherein the styrene (meth)acrylate copolymer is polymerized in the presence of a stabilizer selected from starch or polyvinyl alcohol, preferably starch.

5. The composition according to claim 1, wherein the styrene (meth)acrylate copolymer has a weight average molecular weight <100,000 g/mol.

6. The composition according to claim 1, wherein the composition comprises the cross-linker in an amount of 0.1-5 weight-%.

7. The composition according to claim 1, wherein the cross-linker is selected from ammonium zirconium carbonate, potassium zirconium carbonate, glyoxal or citric acid.

8. The composition according to claim 1, wherein the polyvinyl alcohol has a molecular weight of ≤50,000 g/mol.

9. The composition according to claim 1, wherein the polyvinyl alcohol is at least partially hydrolyzed.

10. The composition according to claim 1, wherein the composition comprises plasticizer in an amount of 0.1-15 weight-%.

11. The composition according to claim 1, wherein the composition comprises 0.1-5 weight % of a natural thickener or of a synthetic thickener.

12. The composition according to claim 1, wherein the composition is free of inorganic mineral pigment particles.

13. The composition according to claim 1, wherein the composition further comprises inorganic mineral particles.

14. A sheet-like product comprising:
    a substrate comprising lignocellulosic fibres, and having a first and a second parallel large surface, and
    a barrier coating layer formed from a barrier coating composition according to claim 1 applied on at least one the surfaces of the substrate.

15. The product according to claim 14, wherein the substrate has a grammage of 25-800 g/m$^2$.

16. The product according to claim 14, wherein the barrier coating layer has a maximum weight of 12 g/m$^2$.

17. The product according to claim 14, wherein the product has KIT test value of at least 8, mineral oil barrier HVTR value of <100 g/m$^2$/d, and/or water vapour barrier WVTR value of <100 g/m$^2$/d.

18. The sheet-like product according to claim 14, wherein the product is suitable for making a food service package.

* * * * *